United States Patent [19]

Wada

[11] Patent Number: 4,500,666

[45] Date of Patent: Feb. 19, 1985

[54] RUBBER COMPOSITION CONTAINING NON-TACKINESS-IMPARTING AGENT AND CONVEYOR BELT HAVING SURFACE LAYER MADE OF VULCANIZATE OF SAID COMPOSITION

[75] Inventor: Noriaki Wada, Kobe, Japan

[73] Assignee: Bando Chemical Industries, Ltd., Kobe, Japan

[21] Appl. No.: 494,052

[22] Filed: May 12, 1983

[30] Foreign Application Priority Data

May 16, 1982 [JP] Japan ................... 57-82796
May 16, 1982 [JP] Japan ................... 57-82797
May 16, 1982 [JP] Japan ................... 57-82798

[51] Int. Cl.$^3$ ............... C08K 5/20; C08L 7/00; C08L 9/00; C08L 83/04
[52] U.S. Cl. ................... 524/232; 524/210; 524/506; 524/230; 198/500; 198/844; 198/846
[58] Field of Search ............ 524/232, 506, 230, 210; 525/185, 190

[56] References Cited

U.S. PATENT DOCUMENTS

| | | | |
|---|---|---|---|
| 2,325,947 | 8/1943 | Garvey | 524/232 |
| 2,470,772 | 5/1949 | Haas | 428/447 |
| 3,562,291 | 2/1971 | Lutzmann et al. | 524/232 |
| 3,803,065 | 4/1974 | Arai et al. | 524/232 |
| 4,172,811 | 10/1979 | Sanford et al. | 198/500 |
| 4,197,937 | 4/1980 | Sanford et al. | 198/500 |
| 4,201,698 | 5/1980 | Itoh et al. | 525/105 |
| 4,234,702 | 11/1980 | Nakamura | 525/105 |
| 4,376,184 | 3/1983 | Itoh et al. | 525/105 |
| 4,391,675 | 7/1982 | Nakamura | 524/506 |
| 4,394,474 | 6/1983 | McKinney et al. | 524/232 |

FOREIGN PATENT DOCUMENTS

| | | | |
|---|---|---|---|
| 2307733 | 11/1976 | France | 198/500 |
| 55-71737 | 5/1980 | Japan | 525/105 |
| 867280 | 5/1961 | United Kingdom | 524/232 |

*Primary Examiner*—Allan M. Lieberman
*Attorney, Agent, or Firm*—Oblon, Fisher, Spivak, McClelland & Maier

[57] ABSTRACT

A rubber composition comprising (1) 100 parts by weight of at least one organic rubber selected from natural rubber and organic synthetic rubbers or 100 parts by weight of a rubber mixture of 99% to 80% by weight of the organic rubber and 2 to 20% by weight of a silicone raw rubber having a molecular weight of 100,000 to 1,000,000 and (2) 0.5 to 50 parts by weight of at least one non-tackiness-imparting agent selected from fatty acid amides. The vulcanizate of said rubber composition is non-tacky and suitable for use as a surface layer for conveyor belts carrying highly tacky substances such as oil sands.

11 Claims, No Drawings

RUBBER COMPOSITION CONTAINING NON-TACKINESS-IMPARTING AGENT AND CONVEYOR BELT HAVING SURFACE LAYER MADE OF VULCANIZATE OF SAID COMPOSITION

This invention relates to a rubber composition, and particularly to a rubber composition capable of forming a non-tacky vulcanized rubber as well as to a conveyor belt in which at least the surface layer is composed of a vulcanizate of such a rubber composition and accordingly is suitably usable particularly for carrying highly tacky substances such as oil sand. The present invention further relates to a method for carrying tacky substances such as oil sand by the use of a belt having a surface layer of a vulcanizate of the rubber composition mentioned above.

Oil sand is a petroleum resource buried in the ground in a large quantity particularly in Canada and Venezuela. The Athabasca oil sand in Canada is especially well-known because it makes up about one third of the total world oil sand reserve. Taking this oil sand as an example, this has the structure that each fine siliceous sand grain is coated with a thin water film which is further surrounded with bitumen. The water film contains very small quantities of metals. Since this oil sand contains generally 5 to 20% by weight of a heavy and highly viscous bitumen, it is being collected commercially as a petroleum resouce. As methods for collecting oil sand, there are a so-called open pit mining and a method wherein bitumen is separated undergound from unnecessary components such as siliceous sand and the like and then collected. In Athabasca, there is being used an open pit mining, in which overburdens are removed and then the oil sand is directly collected. The oil sand collected is thereafter carried to an extractive refining plant by means of belts.

As belts for carrying oil sand, there have heretofore been used rubber belts in which (a) a rubber mixture of natural rubber and styrene-butadiene rubber or (b) acrylonitrile-butadiene rubber is reinforced with a steel cord. However, oil sand adheres to and deposits on these belts, thereby contaminating the belts and reducing the volume of the oil sand transferred. Accordingly, in carrying oil sand to an extractive refining plant, relatively less expensive petroleum fractions such as kerosene, gas oil and the like have been scattered on the belts to prevent adhesion of the oil sand to the belts. But, this method has a fire hazard, accelerates deterioration of the conveyor belt and increases the collection cost. Further, conveyor belts used in Athabasca are required to have excellent characteristics at low temperatures, particularly excellent flexibility at low temperatures, because the atmospheric temperature in winter goes down to around minus 50° C. in Athabasca.

Addition of a silicone raw rubber to an organic rubber followed by vulcanization for imparting non-tackiness to the organic rubber has previously been studied by the present inventors. This method imparts non-tackiness to the organic rubber by reducing the critical surface tension (hereinafter referred to as $\gamma c$) of the vulcanized rubber. The term "$\gamma c$" used herein is a concept advocated by Zisman and refers to a physical constant obtained by extrapolating cosines of contact angles ($\theta$) of various liquids with a specific high polymer solid because these cos $\theta$ values are in a nearly linear relationship with surface tensions of the liquids. In short, $\gamma c$ implies an adhesive power between the high polymer solid and the liquid and is approximately proportional to the cohesive energy of the high polymer solid.

Accordingly, it is generally expected that an increase of the $\gamma c$ of a vulcanized rubber causes the vulcanized rubber to possess an increased tackiness. However, the present inventors have further found that the non-tackiness of a vulcanized rubber can also be improved by adding, to an organic rubber or a mixture thereof with a silicone raw rubber, a certain additive capable of increasing the $\gamma c$ of the vulcanizate of said rubber or mixture and then vulcanizing the resulting compound. Based on this finding, this invention has been accomplished. Particularly, as a result of extensive research on vulcanized rubbers having a surface non-tacky against oil sand, the present inventors have found that the surface of vulcanized rubbers can be made non-tacky against bitumen by adding certain additives to the rubber or rubber mixture as a non-tackiness-imparting agent.

An object of this invention is to provide a rubber composition capable of forming a non-tacky vulcanized rubber as well as a non-tacky conveyor belt having a surface layer made of the vulcanizate of said rubber composition. Another object of this invention is to provide a conveyor belt capable of carrying oil sand which is viscous substantially without allowing said oil sand to adhere to the conveyor belt. Still another object of this invention is to provide a method for carrying oil sand which is viscous by the use of a conveyor belt as mentioned above substantially without allowing said oil sand to adhere to the surface of the belt.

According to this invention, there is provided a rubber composition comprising (1) 100 parts by weight of at least one organic rubber selected from the group consisting of natural rubber and organic synthetic rubbers or a rubber mixture of 98 to 80% by weight of said organic rubber and 2 to 20% by weight of a silicone raw rubber having a molecular weight of 100,000 to 1,000,000 and (2) 0.5 to 50 parts by weight of at least one non-tackiness-imparting agent selected from the group consisting of (a) fatty acid amides, (b) fatty acid glycerides and (c) polyhydric alcohols, polyhydric thioalcohols and monoalkyl ethers thereof represented by the general formula, $(HX)_n$-R-XR' where X is an oxygen or a sulfur atom, R is an alkylene group which may contain an ether or a thioether linkage, R' is a hydrogen atom or an alkyl group having 1 to 12 carbon atoms and n is an integer of 1 or 2.

As the organic synthetic rubber in this invention, there may preferably be used isoprene rubber, styrene-butadiene rubber, acrylonitrile-butadiene rubber, butadiene rubber, chloroprene rubber, and the like. These rubbers may be used alone or in admixture of two or more. As the organic rubber, at least one member selected from natural rubber, isoprene rubber, styrene-butadiene rubber and acrylonitrile-butadiene rubber is preferable. If necessary, to the said rubber may be mixed with butadiene rubber, chloroprene rubber, or the like.

The silicone raw rubber used in this invention is preferably an organopolysiloxane represented by the general formula —$R_2SiO$—, in which R stands for an alkyl group such as methyl, ethyl, propyl, pentyl, hexyl, heptyl, nonyl, decyl, dodecyl, stearyl, palmityl, cyclohexyl, or the like; an alkenyl group such as vinyl, allyl, or the like; an aryl group such as phenyl, naphthyl, or the like;

an aralkyl group such as benzyl, β-phenylethyl, 2-phenylethyl, 2-phenylpropyl, or the like; a haloalkyl group such as 3-chloropropyl, 3,3,3-trifluoropropyl, or the like; or a cyanoalkyl group such as 3-cyanopropyl group or the like. Among them, alkyl groups and aryl groups are preferable, and methyl and phenyl are particularly preferable. The organopolysiloxane generally contains about 0.1 to 1 mole % of vinyl group as part of R in the above general formula. However, the silicone raw rubber used in this invention need not contain vinyl group. In this invention, dimethyl silicone raw rubber is particularly preferable. However, if necessary, methyl vinyl silicone raw rubber and methyl phenyl silicone raw rubber may also be used alone or in combination with dimethyl silicone raw rubber. These silicone raw rubbers, when they have a molecular weight of 100,000 to 1,000,000, are effective in imparting non-tackiness to the above-mentioned organic rubbers.

The quantity of the silicone raw rubber added is 2 to 20% by weight and preferably 5 to 15% by weight based on the total weigth of the organic rubber and the silicone raw rubber. When the quantity of the silicone raw rubber added is less than 2% by weight, its effect is insufficient. On the other hand, when the quantity is more than 20% by weight, processing is difficult and the strength of the vulcanized rubber obtained is inferior.

Non-tackiness-imparting agents of this invention exhibit their effect by being added to organic rubbers. The effect is more preferable when the organic rubber contains the above-mentioned silicone raw rubber.

As the fatty acid amides used in this invention as one of the non-tackiness-imparting agents, there may preferably be used higher fatty acid amides having 6 to 30 carbon atoms, particularly preferably those having 10 to 20 carbon atoms. The higher fatty acids of these amides may be either saturated or unsaturated. Accordingly, as the fatty acid amide, there may preferably be used stearic acid amide, oleic acid amide, palmitic acid amide, lauric acid amide, or the like.

Also in the case of fatty acid glycerides, similarly to the above, there may preferably be used higher fatty acid glycerides having 5 to 30 carbon atoms and particularly preferably those having 10 to 20 carbon atoms. Accordingly, as the fatty acid triglyceride, there may preferably used stearic acid triglyceride, dihydroxystearic acid triglyceride, oleic acid triglyceride, palmitic acid triglyceride, or the like. However, in this invention, the mono- and di-glycerides of higher fatty acids may also be used alone or in combination with the triglycerides, if necessary.

The other non-tackiness-imparting agents are, as described previously, polyhydric alcohols, polyhydric thioalcohols and monoalkyl ethers thereof represented by the general formula $(HX)_n R-XR'$ wherein X is an oxygen or a sulfur atom, R is an alkylene group which may contain an ether or a thioether linkage, R' is a hydrogen atom or an alkyl group having 1 to 12 carbon atoms and n is an integer of 1 or 2. In the above general formula, it is preferable that R' be an alkyl group having 1 to 6 carbon atoms and n be an integer of 1. Accordingly, in this invention, particularly, dihydric alcohols, i.e. glycols and monoalkyl ethers thereof are used preferably. As the glycol, there may preferably be used ethylene glycol, diethylene glycol, triethylene glycol, tetraethylene glycol, polyethylene glycol, poly(oxyethylene oxypropylene)glycol, or the like. As the monoalkyl ether thereof, there may preferably be used ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, or the like. Also, a trihydric alochol such as 3-methylpentane-1,3,5-triol may also be used.

In this invention, the rubber composition contains at least one member of the above mentioned non-tackiness-imparting agents usually in a proportion of 0.5 to 50 parts by weight, per 100 parts by weight of the organic rubber or the rubber mixture. When the quantity of the non-tackiness-imparting agent added is less than 0.5 part by weight, the vulcanized rubber has no surface having a sufficient non-tackiness. On the other hand, when the quantity is more than 50 parts by weight, the non-tackiness-imparting agent is difficult to knead uniformly with the organic rubber or the rubber mixture, and in addition, the non-tackiness-imparting agent in the vulcanizate bleeds sometimes to the surface of the vulcanizate.

In this invention, when fatty acid amides and fatty acid glycerides are used alone as the non-tackiness-imparting agent, they are preferably added in an amount of 0.5 to 20 parts by weight, particularly preferably 1 to 10 parts by weight, per 100 parts by weight of the organic rubber or the rubber mixture. When the polyhydric alcohols, polyhydric thioalcohols and monoalkyl ethers thereof represented by the above mentioned general formula are used alone as the non-tackiness-imparting agent, they are preferably added in an amount of 5 to 50 parts by weight, particularly preferably 10 to 25 parts by weight, per 100 parts by weight of the organic rubber or the rubber mixture. When at least one member selected from the fatty acid amides and fatty acid glycerides and at least one member selected from the above-mentioned polyhydric alcohols, polyhydric thioalcohols and monoalkyl ethers thereof are used together, both members are used preferably in such amounts that the respective quantities fall within the ranges specified above and the total quantity thereof is 50 parts by weight or less per 100 parts by weight of the organic rubber or the rubber mixture.

In some cases, some of the polyhydric alcohols have no good compatibility with the organic rubbers. In such cases, it is preferable that these polyhdyric alcohols be used in combination with their ethers or silica, clay, or the like is previously impregnated with the polyhydric alcohols and the thus impregnated silica, clay or the like is mixed with the organic rubber. Alternatively, polyhydric alcohols may be added to the organic rubber simultaneously with silica, clay, or the like and the resulting mixture may then be kneaded.

The rubber composition in this invention may contain an appropriate vulcanizing agent depending upon the organic rubber used. When there are used, as the organic rubbers, natural rubber, isoprene rubber, styrene-butadiene rubber, acrylonitrile-butadiene rubber, and butadiene rubber, usually, sulfur and/or sulfur-containing compounds may be used as the vulcanizing agents. The sulfur-containing compounds may be any such compounds as long as they can vulcanize the above-mentioned organic rubbers, and there may preferably be used, for example, tetramethylthiuram disulfide, tetraethylthiuram disulfide, and the like. These vulcanizing agents are added in a quantity of 0.1 to 10 parts by weight, preferably 0.5 to 5 parts by weight, per 100 parts by weight of the above-mentioned organic rubber or rubber mixture. Also, a vulcanizing adjuvant may be used in combination with the vulcanizing agent. As the vulcanizing adjuvant, there may be used any vulcanizing adjuvants which have been known for the above-mentioned organic rubbers, in a proportion of 0.1 to 8 parts preferably 0.1 to 3 parts, by weight per 100 parts by weight of the organic rubber or the rubber mixture. There may be used a vulcanization accelerator, for example, diphenylguanidine, a di-o-tolylguanidine salt of dicatecholboric acid, 2-mercaptobenzothiazol, dibenzothiazyl disulfide, N-cyclohexyl-2-benzothiazyl sulfenamide, tetramethylthiuram monosulfide, or the like, and an activator, for example, a metal oxide such as zinc oxide, magnesium oxide, litharge or the like; a fatty acid such as stearic acid, oleic acid or the like; an amine such as triethanol amine, diethanol amine or the like; or another activator such as diethylene glycol, triallyl trimellitate or the like.

Further, when the rubber composition of this invention contains a silicone raw rubber, to the composition may be added an organic peroxide, platinum, a platinum comppound, a metal salt of organic acid, and so forth which are usually used in the vulcanization of silicone raw rubbers. As the organic peroxides, there may be used, for example, benzoyl peroxide, 2,5-dimethyl-2,5-di(t-butylperoxy)hexane, dicumyl peroxide, 1,1-bis(t-butylperoxy)-3,3,5-trimethylcyclohexane, di-t-butyl peroxide, 1,3-bis(t-butylperoxyisopropyl)benzene, and the like. The organic peroxide is added usually in a proportion of 0.1 to 10 parts by weight per 100 parts by weight of the silicone raw rubber.

When chloroprene rubber is used as the organic rubber zinc oxide, magnesium oxide or the like may be used as the vulcanizing agent in a proportion of 0.1 to 10 parts by weight per 100 parts by weight of the organic rubber or the rubber mixture, and if necessary, appropriate vulcanization accelerators may also be used with the vulcanizing agent.

Further, the rubber composition of this invention may contain, in addition to the above-mentioned components, various fillers which are conventionally used in the above-mentioned oganic rubbers, in a conventional proportion. As the fillers, there may be used, for example, carbon black, silica, calcium carbonate, clay, magnesium carbonate, diatomaceous earth, various silicates and organic fillers. When these fillers are added, plasticizers may be used along therewith such as di(2-ethylhexyl) phthalate, di(2-ethylhexyl) adipate, dibutyl phthalate, tri(2-ethylhexyl) trimellitate, tricresyl phosphate and the like, and softeners may also be used such as paraffinic process oils, aromatic process oils and the like. Also, there may be used together therewith age resistors such as phenyl-α-naphthylamine, N,N-diphenyl-p-phenylenediamine, 6-ethoxy-2,2,4-trimethyl-1,2-dihydroquinone, N-phenyl-N'-isopropyl-p-phenylenediamine, 2-mercaptobenzoimidazole, nickel dibutyldithiocarbamate and the like. If necessary, there may further be used scorch retarders, processing aids, and the like.

The rubber composition of this invention can usually be produced by keanding the above-mentioned components by a Banbury mixer, a kneader, a roll or the like.

The rubber composition of this invention is usually vulcanized by pressing it for 10 to 60 min at 130° to 170° C. to obtain a vulcanizate.

The vulcanized rubber thus obtained is markedly excellent in non-tackiness against bitumen and accordingly can be suitably used in the surface layer of conveyor belts for carrying oil sand containing bitumen.

Accordingly, the conveyor belt of this invention is characterized in that at least the surface layer is composed of a vulcanizate of a rubber compound comprising (1) 100 parts by weight of the organic rubber or 100 parts by weight of a rubber mixture of 98 to 80% by weight of said organic rubber and 2 to 20% by weight of a silicone raw rubber having a molecular weight of 100,000 to 1,000,000, (2) 0.5 to 50 parts by weight of at least one non-tackiness-imparting agent selected from the group consisting of (a) fatty acid amides, (b) fatty acid glycerides and (c) polyhydric alcohols, polyhydric thioalcohols and monoalkyl ethers thereof represented by the general formula, $(HX)_n$-R-XR', where X is an oxygen or a sulfur atom, R is an alkylene group which may contain an ether or a thioether linkage, R' is a hydrogen atom or an alkyl group having 1 to 12 carbon atoms, and n is an integer of 1 or 2, (3) 0.1 to 10 parts by weight of a vulcanizing agent and (4) 10 to 200 parts by weight of a filler.

As the organic rubber for use in conveyor belts, preferred are at least one rubber selected from natural rubber, isoprene rubber, styrene-butadiene rubber and acrylonitrile-butadiene rubber. As the filler, carbon black is particularly preferred among the above-metnioned substances. Conveyor belts in which at least the surface layer is composed of a vulcanizate a rubber compound containing the above components and which are reinforced lengthwise with a metal, an organic fiber cord, a canvas or the like, not only have excellent non-tackiness against oil sand but also are superior in oil resistance, flexibility and low temperature characteristics. Accordingly, these conveyor belts are suitably used for carrying oil sand. The appropriate quantity of carbon black added in the case of conveyor belts for carrying oil sand is 20 to 150 parts by weight, preferably 30 to 100 parts by weight, per 100 parts by weight of the above-mentioned organic rubber or rubber mixture.

Accordingly, the preferable conveyor belt for carrying oil sand according to this invention is characterized in that at least the surface layer is composed of a vulcanizate of a rubber compound comprising (1) 100 parts by weight of the organic rubber or a rubber mixture of 98 to 80% by weight of said organic rubber and 2 to 20% by weight of a silicone raw rubber having a molecular weight of 100,000 to 1,0000,000, (2) 0.5 to 50 parts by weight of at least one non-tackiness-imparting agent selected from the group consisting of (a) fatty acid amides, (b) fatty acid glycerides and (c) polyhydric alcohols, polyhydric thioalcohols and monoalkyl ethers thereof represented by the general formula, $(HX)_n$-R-XR', where X is an oxygen or a sulfur atom, R is an alkylene group which may contain an ether or a thioether linkage, R' is a hydrogen atom or an alkyl group having 1 to 12 carbon atoms and n is an integer of 1 or 2, (3) 1 to 5 parts by weight of sulfur and/or a sulfur-containing organic compound as a vulcanizing agent and (5) 20 to 150 parts by weight of carbon black as a filler.

As the organic rubber in the above rubber compound, an acrylonitrile-butadiene rubber containing 15 to 25% by weight of acrylonitrile is preferably used because of its excellent balance of cold resistance and oil resistance.

The above rubber compound may, of course, contain a rubber such as butadiene rubber and chloroprene rubber, a vulcanizing agent and a vulcanizing accelerator therefor, and a filler.

Methods for producing conveyor belts are well known. Conveyor belts in which at least the surface layer is composed of a vulcanizate of the rubber compound mentioned above and which are reinforced lengthwise with a reinforcing cord such as steel cord or organic fiber cord or with a reinforcing material such as canvas or the like are substantially non-tacky against oil sand which is viscous.

Accordingly, the present invention also provides a method for carrying collected oil sand to an intended extractive refining plant. This method is characterized by carrying oil sand by means of a conveyor belt having at least as its surface layer a vulcanizate of a rubber compound comprising (1) 100 parts by weight of at least one of said organic rubbers, preferably from natural rubber, isoprene rubber, styrene-butadiene rubber and acrylonitrile-butadiene rubber or 100 parts by weight of a rubber mixture of 98 to 80% by weight of said organic rubber and 2 to 20% by weight of a silicone raw rubber having a molecular weight of 100,000 to 1,000,000, (2) 0.5 to 50 parts by weight of at least one non-tackiness-imparting agent selected from the group consisting of (a) fatty acid amides, (b) fatty acid glycerides an (c) polyhydric alcohols, polyhydric thioalcohols and monoalkyl ethers thereof represented by the general formula, $(HX)_n$-R-XR', where X is an oxygen or a sulfur atom, R is an alkylene group which may contain an ether or a thioether linkage, R' is a hydrogen atom or an alkyl group having 1 to 12 carbon atoms and n is an integer of 1 or 2, (3) 1 to 5 parts by weight of at least one vulcanizing agent selected from the group consisting of sulfur and sulfur-containing organic compounds and (4) 20 to 150 parts by weight of carbon black as a filler.

Accordingly, in accordance with this method, oil sand can be carried from the collection point to an extractive refining plant without scattering kerosene or the like on the conveyor belt surface as done conventionally and substantially without the oil sand adhering to the surface of the belt. Since the conveyor belt of this invention is also excellent in oil resistance, there is no objection to scattering, if necessary, kerosene or the like on the belt surface.

Hereinunder, Examples of this invention are illustrated. However this invention is not limited to the Examples. Parts are by weight unless otherwise specified.

Example 1

| | |
|---|---|
| Acrylonitrile-butadiene rubber (N250S Japan Synthetic Rubber Co., Ltd.) | 100 parts |
| Oleyl amide | 2 parts |
| Carbon black (HAF N330) | 50 parts |
| Zinc oxide | 5 parts |
| Sulfur | 2 parts |
| Vulcanizing accelerator (N—cyclohexyl-2-benzothiazyl sulfenamide) | 1.2 parts |
| Stearic acid | 1 parts |
| Processing aid (aromatic process oil) | 3 parts |
| Age resistor (mixture (1:1) of N—isopropyl-N'—phenyl-p-phenylene diamine and polymer of 2,2,4-trimethyl-1,2-dihydroquinoline) | 3 parts |

The above materials were uniformly kneaded at 80° to 100° C. by a twin roll and the resulting compound was calendered by a roll to obtain a sheet of 2 mm in thickness. The sheet showed a $\gamma c$ of 43 dyne/cm and an asphalt-peel force of 50 g/cm.

Incidentally, bitumen showed a $\gamma c$ of 32 dyne/cm. For comparison, a sheet was also formed in the same manner from the same rubber compound as the above, except that oleyl amide was omitted, i.e. a conventional acrylonitrile-butadiene rubber compound. This sheet showed a $\gamma c$ of 36 dyne/cm and an asphalt-peel force of 180 g/cm.

The $\gamma c$ was measured in accordance with the following method: As liquids of known surface tensions there were used glycerine, formamide, thiodiglycol, ethylene glycol and polyethylene glycol (average molecular weight: 200). Their contact angles ($\theta$) on a vulcanized rubber were measured at 25° C. By extrapolating cosines of these angles to 1, to obtain $\gamma c$ of the vulcanized rubber. The asphalt-peel force was measured in accordance with the following method: A woodfree paper of 0.08 mm in thickness was pressure-impregnated with an asphalt of a penetration of 200 at a proportion of 0.01 g/cm$^2$. To the resulting paper was bonded the above-mentioned sheet having a size of a 1-cm width and a 10-cm length, for 10 sec at 25° C. under a pressure of 3 kg/cm$^2$. Then, a 180°-peel force was measured at a peel speed of 50 mm/min.

EXAMPLE 2

A sheet was formed in the same manner as in Example 1, except that the oleyl amide was replaced by 2 parts of stearic acid triglyceride. This sheet showed a $\gamma c$ of 40 dyne/cm and an asphalt-peel force of 90 g/cm.

EXAMPLES 3 to 8 AND COMPARATIVE EXAMPLE 1

By a twin roll, there were uniformly kneaded at 80° to 100° C. 100 parts of an acrylonitrile-butadiene rubber (N250S manufactured by Japan Synthetic Rubber Co., Ltd.), 60 parts of carbon black (HAF N330), 5 parts of zinc oxide, 2 parts of sulfur, 1.2 parts of a vulcanization accelerator (N-cyclohexyl-2-benzothiazyl sulfenamide), 1 part of stearic acid, 3 parts of a processing aid (aromatic processing oil), 3 parts of an age resistor (mixture (1:1) of N-isopropyl-N'-phenyl-p-phenylene diamine and polymer of 2,2,4-trimethyl-1,2-dihydroquinoline) and a non-tackiness-imparting agent as shown in Table 1. Then, the resulting compounds were calendered by a roll to obtain sheets of 2 mm in thickness.

These sheets were tested for $\gamma c$ and asphalt-peel force in the same manners as in Example 1. The results obtained are shown in Table 1.

Incidentally, bitumen showed a $\gamma c$ of 32 dyne/cm. For comparison, a sheet was also formed in the same manner from the same compound as the above, except that the non-tackiness-imparting agent was omitted, i.e. a conventional acrylonitrile-butadiene rubber compounds. The results of this sheet are also shown in Table 1.

TABLE 1

| | Example | | | | | | Comparative |
|---|---|---|---|---|---|---|---|
| | 3 | 4 | 5 | 6 | 7 | 8 | Example 1 |
| Ethylene glycol | 20* | 10 | | | 10* | | |
| Diethylene glycol butyl ether | | 10 | | 20 | | 10 | |
| Ethylene glycol ethyl ether | | | | 20 | | | |
| $\gamma c$ (dyne/cm) | 45 | 44 | 41 | 42 | 42 | 39 | 36 |
| Peel force (g/cm) | 50 | 40 | 100 | 60 | 65 | 120 | 180 |

*20 Parts of silica was impregnated with ethylene glycol and the thus impregnated silica was then added.

EXAMPLES 9 to 15 AND COMPARATIVE EXAMPLES 2 to 5

One of the rubbers shown in Table 2 and a dimethyl silicone raw rubber having a molecular weight of about 500,000 were mixed in the proportion shown in Table 2 and then uniformly kneaded by a twin roll. To each of these rubber compounds were added the non-tackiness-imparting agent or agents shown in Table 2, 60 parts of carbon black, 5 parts of zinc oxide, sulfur as shown in Table 2, a vulcanization accelerator as shown in Table 2, 3 parts of a processing aid (aromatic process oil), 3 parts of an age resistor (mixture (1:1) of N-isopropyl-N'-phenyl-p-phenylene diamine and polymer of 2,2,4-trimethyl-1,2-dihydroquinoline), 1 part of stearic acid and a peroxide as shown in Table 2. Each mixture was kneaded uniformly at 80° to 100° C. by a twin roll and then calendered by a roll to obtain a sheet of 2 mm in thickness. These vulcanized sheets were tested for $\gamma c$ and asphalt-peel force and the results obtained are shown in Table 2.

For comparison, sheets of mixtures of a rubber and a silicone raw rubber in different proportions free from the non-tackiness-imparting agent, a sheet of a rubber free from the silicone raw rubber and the non-tackiness-imparting agent, namely, a sheet of a conventional vulcanized rubber, and a vulcanized silicone rubber sheet were subjected to measurement of $\gamma c$ and asphalt-peel force in the same manner to obtain the results shown in Table 2.

As is obvious from the above Examples and Comparative Examples, when a small quantity of a silicone raw rubber and the specific non-tackiness-imparting agents are added to an organic rubber according to this invention, the vulcanizates obtained therefrom have improved non-tackiness as compared with the case where a silicone raw rubber is added alone, and have $\gamma c$ values and asphalt-peel forces close to those of the vulcanized silicone rubber.

In Comparative Example 5, the carbon black was used in an amount of 30 parts and the zinc oxide, sulfur, the vulcanization accelerator, the processing oil and the age resistor were not used.

What is claimed is:

1. A rubber composition comprising:

(1) 100 parts by weight of a rubber mixture of 98 to 80% by weight of at least one organic rubber selected from the group consisting of natural rubber and organic synthetic diene rubbers and 2 to 20% by weight of a silicone raw rubber comprising an organo polysiloxane of the formula -$R_2SiO$-, wherein R is alkyl, alkenyl, arlkyl, haloalkyl or cyanoalkyl; said organopolysiloxane having a molecular weight of 100,000 to 1,000,000, and (2) 0.5 to 50 parts by weight of at least one non-tackiness-imparting agent selected from the group consisting of fatty acid amides.

2. A rubber composition according to claim 1, wherein the fatty acid amides are higher fatty acid amides having 6 to 30 carbon atoms.

3. A rubber composition according to claim 1, wherein the non-tackiness-imparting agent is selected from the group consisting of stearic acid amide, oleic acid amide, palmitic acid amide and lauric acid amide.

4. A rubber composition according to claim 1, wherein the quantity of the non-tackiness-imparting agent is 0.5 to 20 parts by weight.

5. A rubber composition according to claim 3, wherein the quantity of the non-tackiness-imparting agent is 0.5 to 20 parts by weight.

6. A rubber composition according to claim 1, wherein the quantity of the non-tackiness-imparting agent is 1 to 10 parts by weight.

7. A rubber composition according to claim 1, wherein the organic rubber is selected from the group consisting of natural rubber, isoprene rubber, styrene-butadiene rubber, acrylonitrile-butadiene rubber, butadiene rubber and chloroprene rubber.

8. A rubber composition according to claim 7, wherein the organic rubber is selected from the group consisting of natural rubber, isoprene rubber, styrene-butadiene rubber and acrylonitrile-butadiene rubber.

9. A rubber composition according to claim 7, wherein the organic rubber is an acrylonitrile-butadiene rubber containing 15 to 25% by weight of acrylonitrile.

10. A rubber composition according to claim 1, wherein R is a methyl or phenyl group.

11. A rubber composition according to claim 1,

TABLE 2

|  | Example | | | | | | | | Comparative Example | | | | | | |
| --- | --- | --- | --- | --- | --- | --- | --- | --- | --- | --- | --- | --- | --- | --- | --- |
|  | 9 | 10 | 11 | 12 | 13 | 14 | 15 | 16 | 2 | 3 | 4 | 5 | 6 | 7 | 8 |
| Natural rubber[a] |  |  |  | 90 | 90 | 95 | 95 |  |  | 90 | 95 |  |  |  |  |
| NBR[b] | 90 | 90 | 90 |  |  |  |  |  | 90 |  |  | 100 | 100 |  |  |
| SBR[c] |  |  |  |  |  |  |  | 90 |  |  |  |  |  |  | 100 |
| Silicon raw rubber[d] | 10 | 10 | 10 | 10 | 10 | 5 | 5 | 10 | 10 | 10 | 5 | 100 |  |  |  |
| Ethylene glycol |  |  |  |  | 10 |  |  |  |  |  |  |  |  |  |  |
| Diethylene glycol butyl ether | 20 |  | 20 | 20 |  |  | 10 |  |  |  |  |  |  |  |  |
| Oleyl amide |  | 2 |  |  | 2 | 2 |  | 2 |  |  |  |  |  |  |  |
| Stearic acid triglyceride |  |  | 2 |  |  |  |  |  |  |  |  |  |  |  |  |
| Sulfur | 2.0 | 2.0 | 2.0 | 2.5 | 2.5 | 2.5 | 2.5 | 2.0 | 2.0 | 2.5 | 2.5 | — | 2.0 | 2.0 | 2.0 |
| Vulcanization accelerator* | 1.2 | 1.2 | 1.2 | 0.6 | 0.6 | 0.6 | 0.6 | 1.0 | 1.2 | 0.6 | 0.6 | — | 0.6 | 1.2 | 1.2 |
| Percumyl D-40** | 0.1 | 0.1 | 0.1 | 0.1 | 0.1 | 0.05 | 0.05 | 0.1 | 0.1 | 0.1 | 0.05 | 1.0 | — | — | — |
| Asphalt-peel force (g/cm) | 40 | 35 | 25 | 40 | 40 | 35 | 50 | 40 | 45 | 60 | 80 | 10 | 220 | 200 | 230 |
| $\gamma c$ (dyne/cm) | 20–35 | 20–35 | 20–35 | 20–35 | 20–35 | 20–35 | 20–35 | 20–35 | 12 | 13 | 18 | 6 | 29 | 36 | 30 |

[a]SMR-L
[b]Acrylonitrile-butadiene rubber (N250S manufactured by Japan Synthetic Rubber Co., Ltd.) containing 18% by weight of acrylonitrile
[c]Styrene-butadiene rubber SBR 1500 (cold non-oil-extended SBR, styrene ratio 23.5%)
[d]SH 410 manufactured by Toray Silicone Co., Ltd. (dimethyl polysiloxane polymer containing vinyl groups (raw rubber free from fillers)).
*N—cyclohexyl-2-benzothiazyl sulfenamide
**A trade name of Japan Fat and Oil for dicumyl peroxide having a grade of 40%.

wherein the quantity of the silicone raw rubber is 5 to 15% by weight based on the weight of the rubber mixture.

* * * * *